United States Patent
Kato et al.

(10) Patent No.: US 7,284,543 B2
(45) Date of Patent: Oct. 23, 2007

(54) FUEL INJECTION SYSTEM

(75) Inventors: Masaaki Kato, Kariya (JP); Katsuhide Akimoto, Nishio (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 11/603,989

(22) Filed: Nov. 24, 2006

(65) Prior Publication Data

US 2007/0125338 A1 Jun. 7, 2007

(30) Foreign Application Priority Data

Dec. 6, 2005 (JP) ............... 2005-352416

(51) Int. Cl.
*F02B 43/00* (2006.01)
*F04B 17/00* (2006.01)
*F02M 59/00* (2006.01)

(52) U.S. Cl. ............... 123/527; 417/397; 239/533.2

(58) Field of Classification Search .......... 123/27 GE, 123/525, 527; 417/397; 239/88, 96, 533.12, 239/533.2, 533.3
See application file for complete search history.

(56) References Cited

U.S. PATENT DOCUMENTS 4,682,712 A * 7/1987 Bohnensieker ............. 417/397

2006/0081722 A1 4/2006 Kato et al.

FOREIGN PATENT DOCUMENTS

| JP | 63-4365 | 12/1988 |
|---|---|---|
| JP | 1-88054 | 9/1989 |
| JP | 2003-232234 | 8/2003 |

* cited by examiner

*Primary Examiner*—Noah P. Kamen
(74) *Attorney, Agent, or Firm*—Nixon & Vanderhye P.C.

(57) ABSTRACT

A fuel injection system includes (i) an injector for injecting gaseous fuel and liquid fuel into a cylinder of an internal combustion engine, (ii) a gaseous fuel supplying unit having a gaseous feel tank as a first high-pressure accumulating source for pressurizing gaseous fuel, (iii) a liquid fuel supplying unit having a common rail as a second high-pressure accumulating source for pressurizing liquid fuel; (iv) a fuel pump as a pressure feeding unit that pressure feeds liquid fuel to the common rail; and (v) a compressor as a pressure increasing unit, which is operated under pressure of the pressurized gaseous fuel to increase pressure of liquid fuel pressure fed from the fuel pump.

7 Claims, 10 Drawing Sheets

FUEL INJECTION SYSTEM

CROSS REFERENCE TO RELATED APPLICATION

This application is based on and incorporates herein by reference Japanese Patent Application No. 2005-352416 filed on Dec. 6, 2005.

FIELD OF THE INVENTION

The present invention relates to a fuel injection system that injects liquid fuel and gaseous fuel into a cylinder of an internal combustion engine.

BACKGROUND OF THE INVENTION

Recently, importance has been placed on the cleanliness of exhaust gas and reduction in the discharge of $CO_2$ with respect to automobile engines and the like. There is a limit in meeting these requirements with the combustion of fossil liquid fuel in conventional engines. There have been commercialized or developed gas combustion engines that burn such fossil fuel as gaseous fuel derived from natural gas, petroleum gas, and moreover hydrogen gas.

With conventional gaseous fuels, sufficient durability cannot be ensured in in-cylinder direct injection engines because of their poor lubricity. Specifically, various problems, including wear and seizure in sliding parts in injectors and nozzles and poor sealability for fuel due to wear in valve seats, have arisen. In compression ignition engines, such fuels as hydrogen and compressed natural gas low in cetane number are inferior in ignitability, and they make operation unstable.

Methods for solving the above-mentioned problems are disclosed in, for example, JP-2003-232234A, JP-S63-4365U, and JP-H1-88054U.

In the method disclosed in JP-2003-232234A, the injection of gaseous fuel and liquid fuel is controlled according to engine operating conditions, and the running performance is thereby enhanced to increase output and reduce exhaust gas. However, this method has a drawback. The engine used in the method has a wide range of operation by liquid fuel for an engine that uses gaseous fuel as main fuel, and it is required to provide two large fuel tanks. Further, a fuel injection valve and a supply circuit are respectively required for two systems, one for gas and one for liquid.

In JP-S63-4365U, there is disclosed such a construction that aside from working fluid for driving an injector, mineral seal oil is introduced into an injector to ensure lubricity for the sliding parts of a needle. However, this method also has drawbacks. The construction is complicated, and mineral seal oil pressure is constantly applied to a needle seal groove, which causes the mineral seal oil to constantly leak into working fluid and gaseous fuel.

The method disclosed in JP-H1-88054U is simpler in construction than the method disclosed in JP-S63-4365U in that working fluid is also used as lubricating oil. In the method, working fluid and gaseous fuel collect in a mineral seal oil sump, and the lubricity for a needle is thereby ensured. However, this method also involves a problem. It is difficult for working fluid to get into the lower part of the mineral seal oil sump, e.g., the nozzle hole side of the sump, because of gaseous fuel pressure; therefore, the lubricity for the lower part of a needle cannot be ensured.

In both the method disclosed in JP-S63-4365U and the method disclosed in JP-H1-88054U, the lubricity is ensured only for sliding parts. However, these methods have drawbacks that wear in a valve seat cannot be reduced and fine liquid fuel injection for ensuring ignitability cannot be carried out.

Gaseous fuel is prone to leak; namely, a leak may occur from an injector having a portion, where metallic surfaces are in tight contact, and get out of a fuel circuit. These methods are not provided with a construction or a function for coping with leaking gaseous fuel.

SUMMARY OF THE INVENTION

The invention has been made with the above-mentioned situation taken into account. It is an object of the invention to provide a fuel injection system that injects liquid fuel and gaseous fuel into a cylinder of an internal combustion engine.

According to an aspect of the present invention, a fuel injection system is provided as follows. A gaseous fuel supplying unit is included to have a first high-pressure accumulating source for pressuring gaseous fuel. A liquid fuel supplying unit is included to have a second high-pressure accumulating source for pressurizing liquid fuel. An injector is included to inject the pressurized gaseous fuel and the pressurized liquid fuel. A pressure feeding unit is included to pressure feed liquid fuel to the second high-pressure accumulating source. A pressure increasing unit is included to be operated under pressure of the pressurized gaseous fuel to increase pressure of liquid fuel pressure fed from the pressure feeding unit.

Under this structure, pressure of gaseous fuel is used for pressure feeding liquid fuel to a common rail as a second high-pressure accumulating source, which can simplify a pressure feeding unit for liquid fuel.

The above fuel injection system may be assembled to an internal combustion engine, and pressure of liquid fuel may be determined according to an operating condition for the internal combustion engine. In an injector, opening/closing control is performed for high-pressurized liquid fuel fed into a control chamber from a common rail. Here, a needle of the nozzle is closed by pressure of liquid fuel while the needle is opened by pressure of gaseous fuel. In this injector, when pressure of the liquid fuel is increased, a time to lift the needle during gaseous fuel injection is increased, which can decrease a ratio of gaseous fuel injection. In contrast, when pressure of the liquid fuel is decreased, a time to lift the needle during gaseous fuel injection is decreased, which can increase a ratio of gaseous fuel injection. In other words, changing the pressure of the common rail depending on an operating condition for the internal combustion engine can provide a variety of controls for an injection ratio.

The above injection system may be provided with a pressure increasing unit having a cylinder and a piston that reciprocates in the cylinder, and pressure increasing action is caused by bidirectional strokes in reciprocation of the piston. This simultaneously allows both taking in liquid fuel to the pressure increasing unit and pressure feeding the liquid fuel to the second high-pressure accumulating source, which can provide an effective liquid fuel pressure supply with less frequent strokes.

The above injection system may be provided with a pressure increasing unit having a cylinder and a piston that reciprocates in the cylinder, and pressure increasing action is caused by unidirectional strokes in reciprocation of the piston. This can simplify the structure of the pressure increasing unit.

The above injection system may be provided with a pressure increasing unit including a selector valve that switches paths providing the pressurized gaseous fuel, and the selector valve is a two-position on/off valve. Control chambers may oppose each other to sandwich the piston of the pressure increasing unit. In this structure, the piston is moved left or right within the control chambers by switching the two-position on/off valve, which allows high-pressurized gaseous fuel to be introduced alternately to the control chambers. Thus pressure of the liquid fuel can be easily increased.

The above injection system may be provided with a pressure increasing unit including a selector valve that switches paths providing the pressurized gaseous fuel, and the selector valve is a three-position on/off valve. This three-position on/off valve can stop gaseous fuel that is pressure fed to the pressure increasing unit, which stops increasing pressure by the pressure increasing unit. Thus, reciprocation and stop of the piston can be performed and pressure increasing speed by the pressure increasing unit can be adjusted.

The above injection system may be provided such that pressurized gaseous fuel is injected from a nozzle hole of the injector, and the pressurized liquid fuel also functions as control fluid that controls needle lift in the injector. This allows control for higher-pressurized gaseous fuel compared to direct control of needle lift using electric actuator or the like.

According to another aspect of the present invention, a fuel injection system is provided as follows. An injector is included into which pressurized gaseous fuel is introduced and which injects the gaseous fuel. A recovery flow passage is included for recovering gaseous fuel leaking from a gap area and mixing the recovered gaseous fuel into gaseous fuel introduced into the injector.

This can prevent high-pressurized gaseous fuel from leaking from the system. The gaseous fuel that leaks out is recovered and used as gaseous fuel to be injected via the injector. Therefore, a user need not handle with the recovered gaseous fuel. Further, a fuel cost can be reduced by an amount equivalent to the recovered fuel.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

First Embodiment

Figure 1:
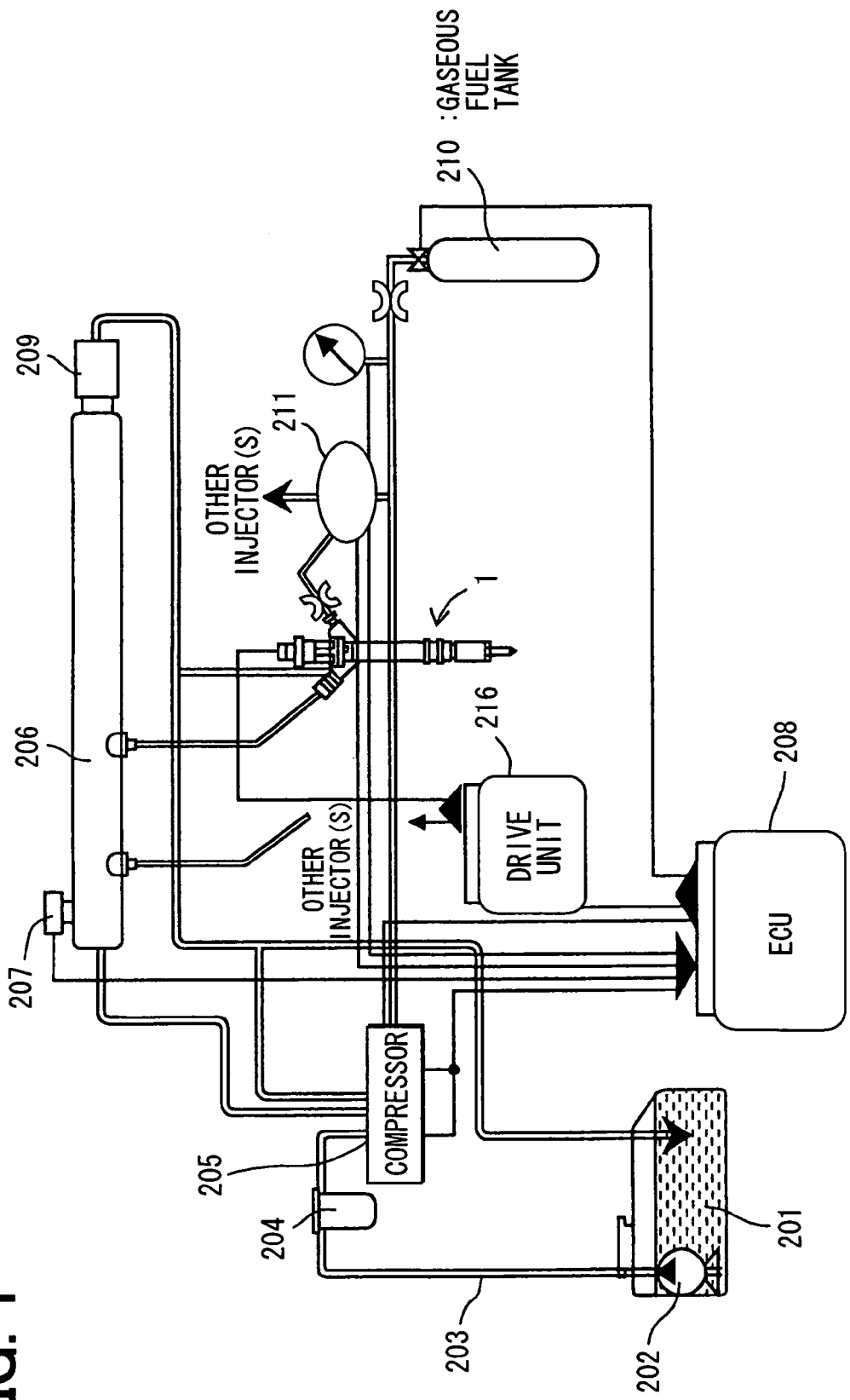
FIG. 1 is a drawing illustrating a configuration of a fuel injection system in a first embodiment.

A fuel injection system is fabricated as an embodiment of the invention. FIG. 1 illustrates a configuration of the fuel injection system in this embodiment.

The fuel injection system in this embodiment pressure feeds liquid fuel such as light oil and gaseous fuel such as hydrogen to an injector 1 as one of multiple injectors, and injects them from the injector 1. Description will be given to the configuration of the fuel injection system in this embodiment, together with paths for fuels.

First, description will be given to the path through which liquid fuel such as light oil is pressure fed to the injector 1.

The light oil (liquid fuel) to be injected from the injector 1 is stored in a liquid fuel tank 201. The light oil is drawn from the liquid fuel tank 201 by a feed pump 202. The liquid fuel goes through a pipe 203. Fine dust, moisture, and foreign matter mixed in the liquid fuel are removed through a filter 204. Then, the light oil is pressurized to a predetermined pressure at a compressor (pressure pump) 205.

The pressurized light oil goes through a common rail (second accumulating source) 206, and is pressure fed to multiple injectors 1 connected to the common rail 206. The common rail 206 is equipped with a pressure sensor 207, which constantly monitors the pressure of the common rail 206. Measured pressure values are sent to ECU (Electronic Control Unit) 208.

The ECU 208 causes the compressor 205 to pressurize liquid fuel when the pressure of the common rail 206 drops and gets out of a preset range, and stops the operation of the compressor 205 when the pressure of the common rail rises. The ECU 208 drives a drive unit 216 for the injectors 1. To constantly drive the injectors 1, the drive unit 216 sends a driving signal to the injectors 1. For this reason, the liquid fuel is constantly used to open and close the injection valves of the injectors 1. Therefore, when the compressor 205 is stopped, the pressure of the common rail 206 is lowered.

The pressure of the common rail 206 is controlled through the above-mentioned feedback control. In addition, the common rail 206 is provided with a safety valve 209. When a predetermined pressure is exceeded, this valve opens to return the liquid fuel to the inlet of the compressor 205 or the liquid fuel tank 201, and thereby prevents excessive pressure from being applied to the common rail 206.

Description will be given to a path for pressure feeding gaseous fuel such as hydrogen to the injectors 1.

Gaseous fuel is accumulated in a gaseous fuel tank (first accumulating source) 210. The gaseous fuel is pressure fed to the injectors by way of an accumulator 211, and is injected into engine cylinders under a predetermined condition. The accumulator 211 has a function of reducing pulsation in hydrogen. The gaseous fuel is also pressure fed to the compressor 205, and is also used for pressurizing the liquid fuel, pressure fed from the feed pump 202, to pressure feed it to the common rail 206.

Any publicly known device can be used in this embodiment as long as the device is capable of performing the above-mentioned operation.

Description will be given to the injectors 1 with reference to FIGS. 2 to 5. The injector 1 typically illustrated in FIG. 2 controls the opening and closing of a path for high-pressure liquid fuel (e.g., light oil) supplied from the liquid common rail 206 to its control chamber 111. When driving and closing a needle 121 of its nozzle 12, the injector uses the pressure of the liquid fuel; when driving and opening the needle 12, it uses the pressure of the gaseous fuel (e.g., hydrogen).

Figure 2:
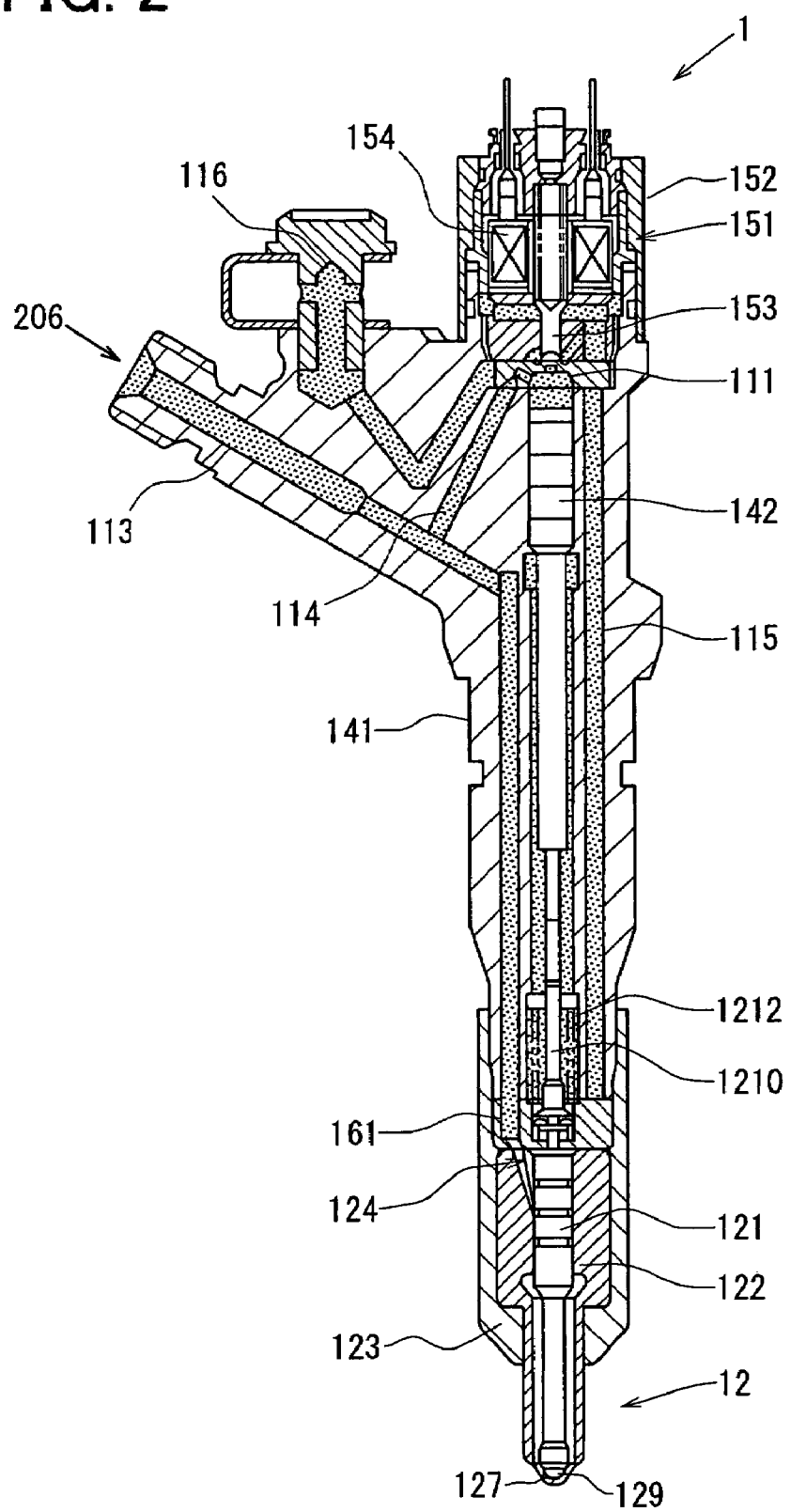
FIG. 2 is a sectional view of an injector of the fuel injection system in the first embodiment.
Figure 3:
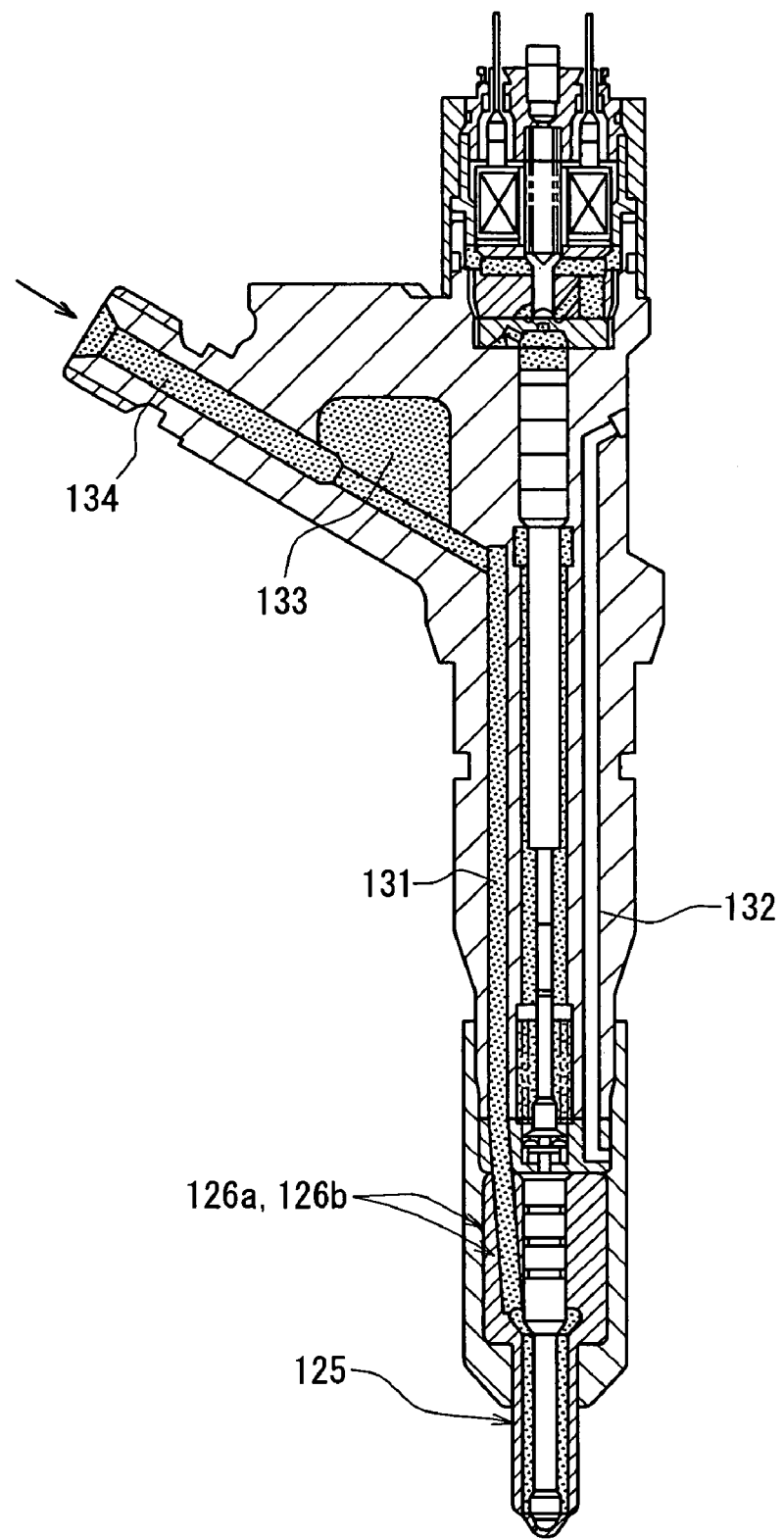
FIG. 3 is a sectional view of an injector of the fuel injection system in the first embodiment.

The basic structure and liquid drive section of the injector 1 illustrated in FIG. 2 are publicly known and the same as those of commercially available injectors. The injector in this embodiment is so constructed that the following are implemented: a passage 131 for injecting gaseous fuel, illustrated in FIG. 3, is added; an injection passage through which liquid fuel is led to a nozzle chamber 125 in the nozzle 12 is disused; and instead, a passage 124 for lubricating the guide section 1211 of the needle 121 is added so that liquid lubricates the guide section 1211.

The injector 1 is constructed of an injector body 141, tip packing 161, an electromagnetic valve 151, and the nozzle 12. The nozzle 12 and the tip packing 161 are integrally fastened to the injector body 141 by a retaining nut 123; the electromagnetic valve 151 is fastened to the injector body 141 by a nut 152. In the injector body 141 of the injector 1, there are formed passages 131 and 134 for high-pressure gaseous fuel. An injector chamber 133 of the injector 1 having a large flow passage sectional area is formed between the high-pressure gas passages 131 and 134 or at some midpoint in each of the passages. The injector chamber 133 has as large a volumetric capacity as several cubic centimeters.

In the injector 1, there is formed a passage 132 for recovering gaseous fuel leaking from the tight contact faces between the nozzle 12, tip packing 161, and injector body 141. In the injector body 141, there is slidably formed a control piston 142. The lower end of the control piston 142 is abutted against the upper end of the needle 121, and its upper end faces toward the control chamber 111.

The electromagnetic valve 151 is constructed of a control valve 153 and a solenoid 154. The control valve 153 is biased by a spring so that the outlet of the control chamber 111 is closed. When a driving current is applied to the solenoid 154 according to a valve opening command from a computer (calculating means), not shown, the control valve 153 is pulled up against spring force to open the outlet of the control chamber 111. When the control valve 153 is opened, the high-pressure fuel is discharged from the control chamber 111. The inlet throttle of the control chamber 111 controls the high-pressure fuel that goes from a high-pressure passage 114 into the control chamber 111. The outlet throttle of the control chamber 111 controls discharge from the control chamber to a low-pressure recovery passage 115 and an outlet 116. These throttles are so set that the outlet throttle is larger in flow passage area than the inlet throttle. Therefore, when the control valve 153 is opened, the pressure of the control chamber 111 drops. When the pressure of the control chamber 111 drops, force that pushes down the control piston 142 and the needle 121 is reduced. Thus, force by which the high-pressure gas pushes up the needle 121 becomes greater than the resultant force of force from the spring 1212 and force by which the lowered pressure of the liquid in the control chamber 111 pushes up. As a result, force from the high-pressure gas moves up the needle 121, and a seat section 128 is lifted from a nozzle body 122, which injects the high-pressure gaseous fuel into a combustion chamber of the engine through a sac chamber 129 and a nozzle hole 127.

Figure 4:
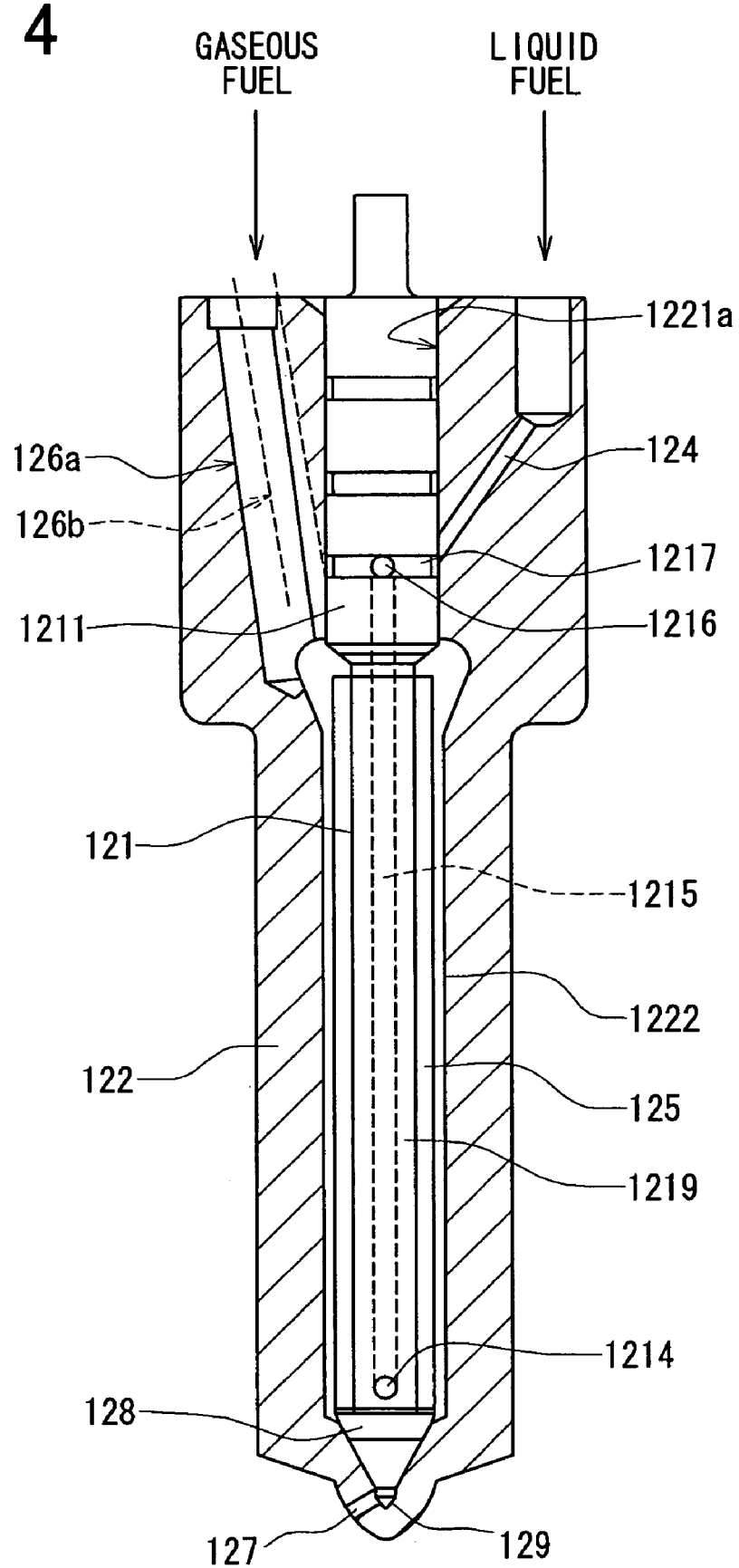
FIG. 4 is a sectional view of an injector of the fuel injection system in the first embodiment.

FIG. 4 illustrates the nozzle 12 integrally fastened to the injector 1 by the retaining nut 123 in an enlarged manner.

The nozzle 12 illustrated in FIG. 4 is shown at a section passing through gaseous fuel passages 126a and 126b and a liquid fuel passage 124. The nozzle 12 is so constructed that its needle 121 is freely slidable in the nozzle body 122. The needle 121 is biased downward by the spring 1212 provided in the spring chamber 1210, and is tightly pressed against the nozzle body 122 at the seat section 128 of the needle 121, thereby blocking gaseous fuel.

In the nozzle body 122, there are formed feed passages (two passages in this embodiment) 126a and 126b as high-pressure gas passages. The multiple feed passages are required for increasing the volumetric capacity for gaseous fuel in the nozzle body 122. Needless to add, more than two feed passages may be provided to ensure an inside diameter for expanding the volumetric capacity.

In the nozzle body 122, there is formed the nozzle chamber 125 that communicates with the feed passages 126a, 126b. This nozzle chamber 125 is so formed that the following are implemented: the inside diameter 1222 of the nozzle body 122 is increased and the outside diameter of the stem section 1219 of the needle 121 is reduced; and the volume of gaseous fuel housed in the chamber 125 is thereby increased.

Figure 5:
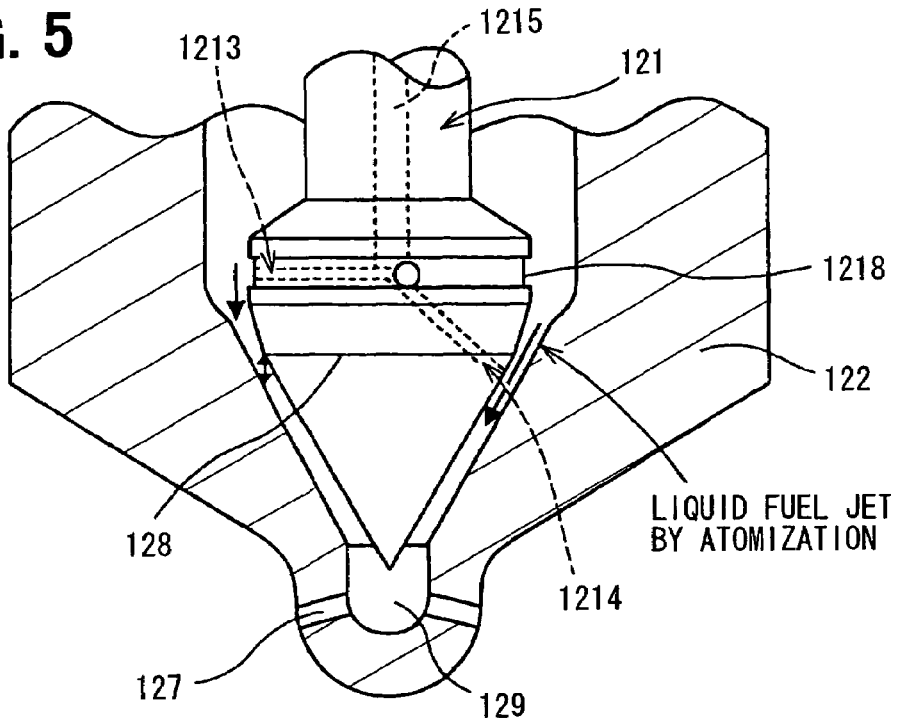
FIG. 5 is a sectional view of a portion in proximity to a needle of an injector of the fuel injection system in the first embodiment.

A fuel passage 1215 is formed in the needle 121, and communicating holes 1213 and 1214 are open at the tip of the needle 121, as illustrated in FIG. 5. This fuel passage 1215 has a communicating hole 1216 open to an annular groove 1217 so that when the needle 121 is opened, the fuel passage communicates with the lubrication passage 124. When the needle 121 is opened and lifted, the annular groove 1217 communicates with the lubrication passage 124. As a result, liquid fuel for lubrication is supplied to the tip of the needle 121 through the passage 124, annular groove 1217, communicating hole 1216, fuel passage 1215, and communicating holes 1213 and 1214. The liquid fuel supplied to the annular groove 1217 lubricates the guide section 1221a of the needle 121 and the inside diameter portion 1222 of the body 122, which are sliding parts located between the needle 121 and the body 122, and thereby prevent wear in these parts.

In the nozzle body 122, there is formed the high-pressure liquid passage 124, which is open to the sliding parts of the guide section 1211 of the needle 121 and the body 122. The fuel filled in the annular groove 1217 for lubrication of the guide section 1221a and inside diameter portion 1222 is pushed up to the upper part of the guide section 1211 by liquid fuel pressure and the high-pressure gas in the nozzle chamber 125. Then it leaks into the spring chamber 1210 in the injector body 141 and returns to the liquid tank, not shown, through the low-pressure recovery passage 115 and the low-pressure recovery outlet 116.

At the tip of the nozzle body 122, there is the sac chamber 129 defined by the body 122 and the needle 121, and it communicates with the nozzle hole 127 open in the body 122 and connects to a combustion chamber of the engine.

Since the communicating holes 1213 and 1214 are open at the tip of the needle 121, the seat section 128 of the needle 121 can be prevented from being worn by impact force when the seat section 128 is seated on the body 122.

The role of the communicating hole 1213 is as follows: when the needle 121 is opened, liquid fuel is fed from the liquid fuel passage 124 through the annular groove 1217, communicating hole 1216, the fuel passage 1215 to the communicating holes 1213 and 1214; the liquid fuel is then fed along the surface of the needle 121 by injected gaseous fuel to thereby lubricate the seat section 128.

At this time, the flow velocity of gaseous fuel is low and a high pressure is thereby maintained in the opening area of the communicating hole 1213. Therefore, liquid fuel is sucked out through the communicating hole 1213 to the extent that the surface of the seat section 128 is moistened with the liquid fuel. To evenly moisten the seat section 128, an annular groove 1218 is formed upstream of the seat section 128 at the tip of the needle 121. The liquid fuel from the communicating hole 1213 spreads throughout this groove 1218 and is conveyed by gaseous fuel, and the seat section 128 can be evenly moistened with the liquid fuel. As a result, wear in the seat section 128 can be prevented.

The communicating hole 1214 is open immediately downstream of or immediately upstream of the seat section 128, as illustrated in FIG. 5. When the needle 121 is closed, gaseous fuel passes through this area at high speed. Therefore, liquid fuel is sucked out through the communicating hole 1214 by atomization and is conveyed by gaseous fuel. The liquid fuel is atomized and injected into a combustion chamber of the engine, together with gaseous fuel.

The liquid fuel that got out through the communicating hole 1213 at the previous time of injection and has moistened the seat section 128 is broken away from the seat section 128 and is injected into the combustion chamber of a cylinder of the engine, together with gaseous fuel. This liquid fuel injected into the cylinder is ignited by itself in the air compressed at high temperature and high pressure in the cylinder, and thus makes an igniting source for gaseous fuel that is resistant to ignition and accomplishes stable combustion.

When the needle 121 is opened, in this embodiment, liquid fuel has been supplied to the communicating holes 1213 and 1214 communicated with its high-pressure fuel source. Thus, a predetermined quantity of the liquid fuel is caused to flow out by gaseous fuel pressure and flow velocity for injection or lubrication.

The injector is so set that the following is implemented: when engine load is high, the opening time of the needle 121 is lengthened to increase the outflow of liquid fuel. The quantity of injected liquid fuel is set to a quantity required for idling the engine or less.

Description will be given to a pressure pump mechanism with reference to FIGS. 6 to 8.

Figure 6:
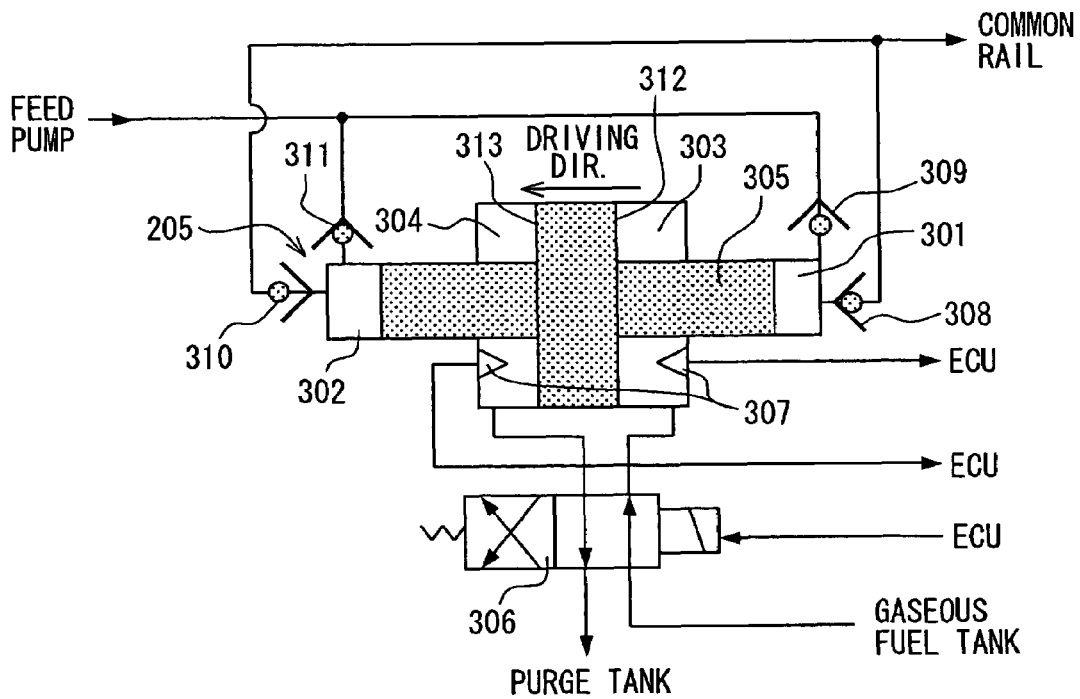
FIG. 6 is a drawing illustrating a configuration of a compressor of the fuel injection system in the first embodiment.

As illustrated in FIG. 6, the compressor 205 is constructed of a first control chamber 301, second control chamber 302, third control chamber 303, fourth control chamber 304, pressure piston 305, pressure control valve 306, position sensor 307, first valve 308, second valve 309, third valve 310, and fourth valve 311.

The pressure piston 305 is so constructed that it can reciprocate in control chambers in the driving direction indicated in FIG. 6. The liquid fuel pressure fed from the feed pump 202 pushes the second valve 309 open and goes into the first control chamber 301, and pushes the fourth valve 311 open and goes into the second control chamber 302. At this time, the gaseous fuel pressure fed from the gaseous fuel tank 210 goes into the third control chamber 303 by way of the pressure control valve 306.

When the gaseous fuel pushes the plane A 312 of the pressure piston 305, the pressure piston 305 is displaced to the left in FIG. 6 (the driving direction in the drawing). When the pressure piston 305 is displaced to the left, the volumetric capacity of the second control chamber 302 is reduced. As a result, the liquid fuel in the second control chamber 302 is pushed out, and it pushes the third valve 310 open and is pressure fed to the common rail 206.

Meanwhile, since the volumetric capacity of the first control chamber 301 is increased, new liquid fuel is pressure fed into the first control chamber 301 by way of the second valve 309. The position of the pressure piston 305 is detected by the position sensor 307. Therefore, when the pressure piston 305 slides to a predetermined position in the fourth control chamber 304, the setting of the pressure control valve 306 is switched as illustrated in FIG. 7 according to an ECU signal. The gaseous fuel from the gaseous fuel tank 210 goes into the fourth control chamber 304.

Since the gaseous fuel pushes the plane B 313 of the pressure piston 305, the pressure piston 305 slides to the right. When the pressure piston 305 slides to the right, the volumetric capacity of the first control chamber 301 is reduced. As a result, the liquid fuel in the first control chamber 301 is pushed out, and pushes the first valve 308 open and is pressure fed to the common rail 206.

Liquid fuel from the feed pump 202 can be pressure fed by repeating the above-mentioned operation.

The sectional areas of the third control chamber 303 and the fourth control chamber 304 are larger than the sectional areas of the first control chamber 301 and the second control chamber 302. Therefore, the pressure of liquid fuel pressure fed to the common rail can be made higher than the gaseous fuel pressure.

Figure 7:
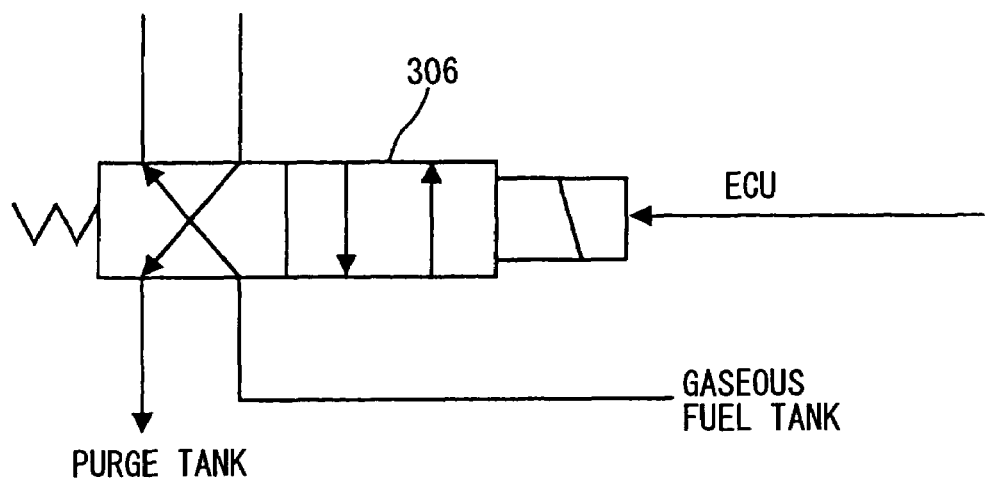
FIG. 7 is a drawing illustrating an operation of a pressure control valve of a compressor of the fuel injection system in the first embodiment.
Figure 8:
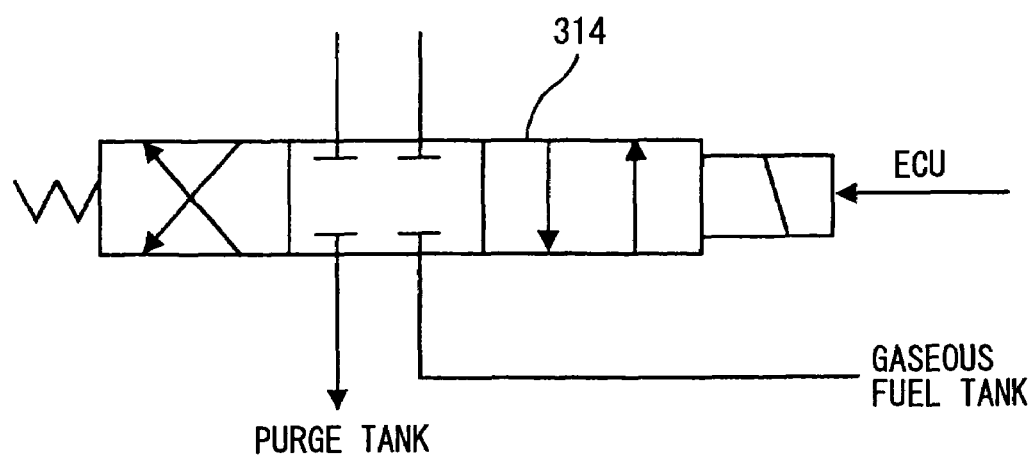
FIG. 8 is a drawing illustrating a configuration of a modification to the compressor of the fuel injection system in the first embodiment.

The pressure control valve illustrated in FIGS. 6 and 7 is a valve of two-position on/off valve type. Use of a pressure control valve 314 of three-position on/off valve type illustrated in FIG. 8 brings about the following effects: the incoming and outgoing of gaseous fuel can be stopped; pressure feed of liquid fuel can be temporarily stopped; and a pressure feed speed can be adjusted.

Figure 9A:
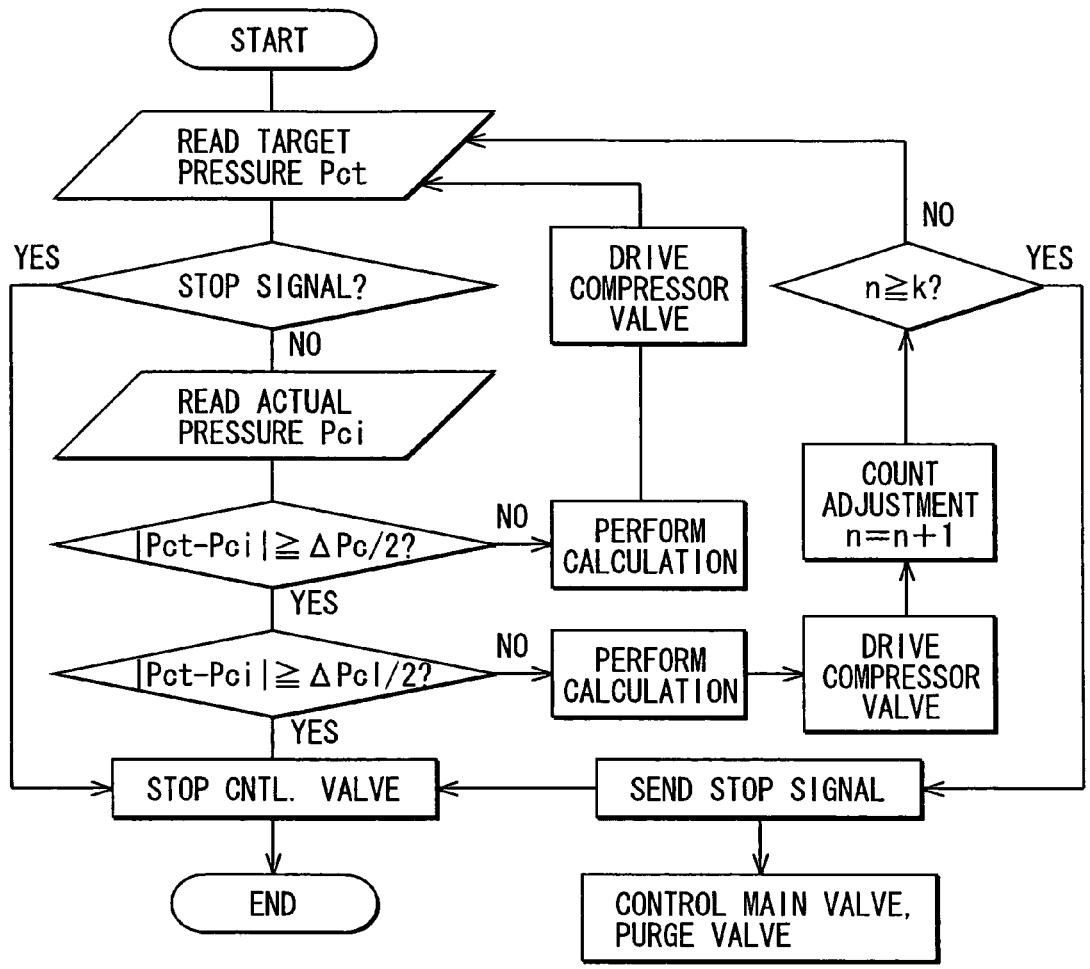
FIG. 9A is a flowchart illustrating control of the compressor of the fuel injection system in the first embodiment.
Figure 9B:
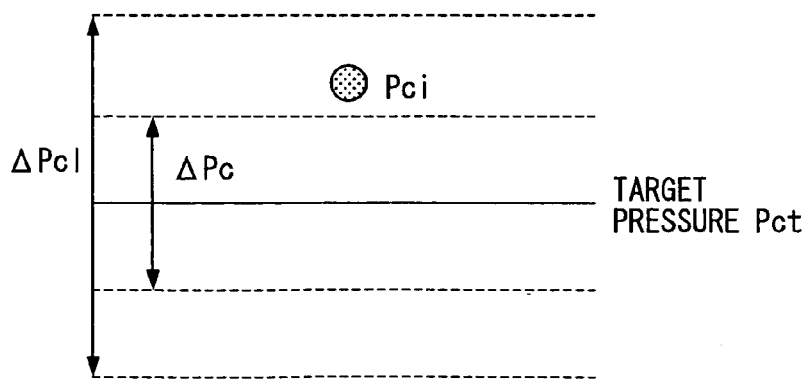
FIG. 9B is a graph explaining the control illustrated in FIG. 9A.

Description will be given to an example of the control of common rail pressure using the compressor 205 in accordance with the determination method illustrated in FIG. 9A and FIG. 9B.

First, the ECU reads an operating condition and a target common rail pressure Pct. When a stop signal has not come in, the ECU reads an actual pressure Pci and controls a compressor valve so that the target pressure is obtained.

In cases where the absolute value of (Pct−Pci) is equal to or higher than ½ of ΔPcl (|Pct−Pci|≧ΔPcl ×½) at this time, the ECU determines that the common rail chamber pressure has exceeded a limit range, and stops the pressure control valve.

When the absolute value of (Pct−Pci) is less than ½ of ΔPc (|Pct−Pci|<ΔPc×½), the ECU performs calculation, and drives the compressor valve to continues to adjust the common rail pressure to the target common rail pressure. Thus, the common rail pressure can be adjusted to a predetermined pressure.

In cases where $\Delta Pc \times \frac{1}{2} < |Pct-Pci| < \Delta Pcl \times \frac{1}{2}$, the ECU performs calculation and drives the compressor valve. In cases where the common rail chamber pressure does not fall into a pressure control tolerance even after the compressor valve is controlled by a predetermined number of times (taken as K), the ECU determines that some trouble, such as cracking in a pipe, has occurred. Then it sends a stop signal to stop the pressure control valve, and further controls a main valve and a purge valve.

Second Embodiment

Figure 10:
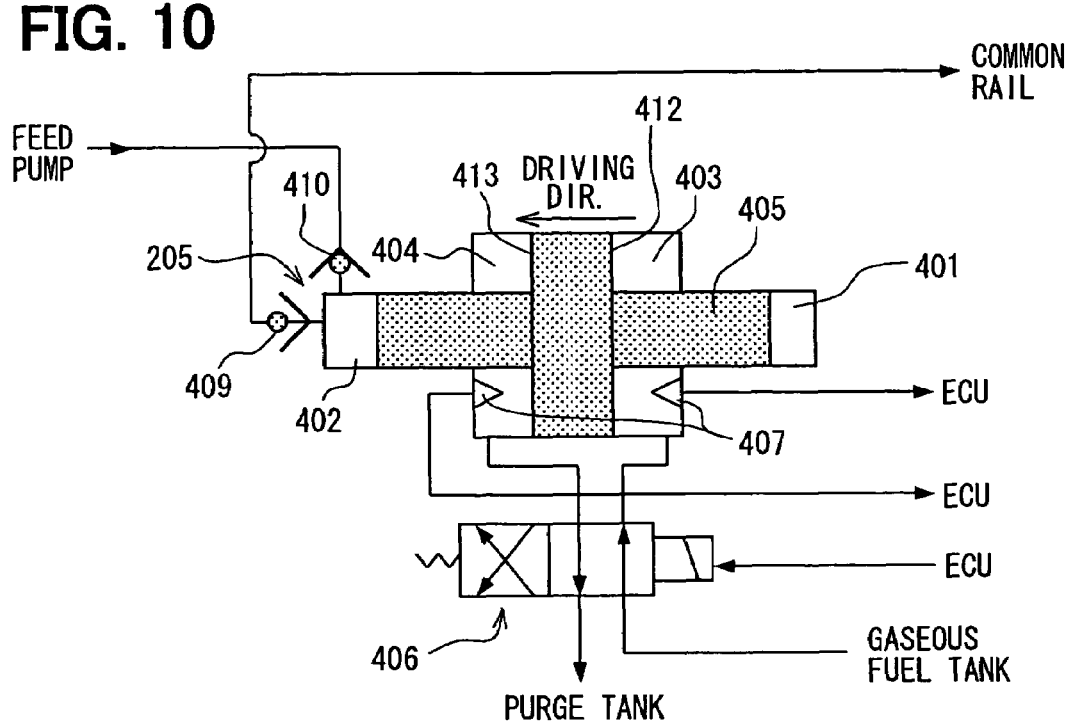
FIG. 10 is a drawing illustrating a configuration of a compressor of a fuel injection system in a second embodiment.

This embodiment is a modification to the first embodiment. It is a system having a compressor 205, structure of which is simplified by disusing the pipe extending from the feed pump 202 to the first control chamber and the pipe extending from the first control chamber to the common rail. FIG. 10 shows the compressor 205 in this embodiment. The members of the compressor 205 in this embodiment, that are not specially referred to are those having the same function and structure as of the compressor in the first embodiment.

The liquid fuel pressure fed from the feed pump 202 pushes a third valve 410 open and goes into a second control chamber 402. At this time, the gaseous fuel pressure fed from the gaseous fuel tank 210 goes into a third control chamber 403 by way of a pressure control valve 406.

When the gaseous fuel pushes the plane A 412 of a pressure piston 405, the pressure piston 405 slides to the left. When the pressure piston 405 slides to the left, the volumetric capacity of the second control chamber 402 is reduced. As a result, the liquid fuel in the second control chamber 402 is pushed out, and pushes a second valve 409 open and is pressure fed to the common rail. The setting of the pressure control valve 406 is changed, and gaseous fuel from the gaseous fuel tank goes into the second control chamber 402. Since the gaseous fuel pushes the plane B 413 of the pressure piston 405, the pressure piston 405 slides to the right. At this time, however, new light oil is only pressure fed into the second control chamber 402 and the liquid fuel is not pressure fed to the common rail.

FIG. 10 further shows a first control chamber 401, a fourth control chamber 404, and a piston sensor 407.

Third Embodiment

Figure 11:
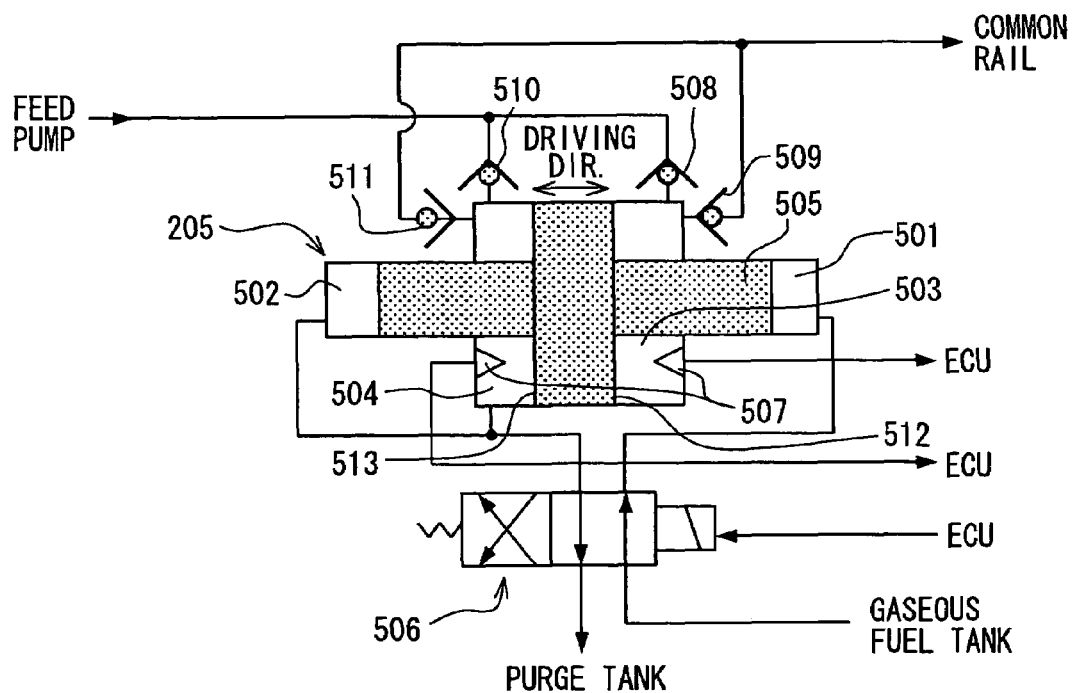
FIG. 11 is a drawing illustrating a configuration of a compressor of a fuel injection system in a third embodiment.

This embodiment is a modification to the first embodiment and is a system having a compressor 205 illustrated in FIG. 11. The members of the compressor 205 in this embodiment, that are not specially referred to are those having the same function and structure as of the compressor in the first embodiment.

The compressor 205 is constructed of a first control chamber 501, second control chamber 502, third control chamber 503, fourth control chamber 504, pressure piston 505, pressure control valve 506, position sensor 507, first valve 508, second valve 509, third valve 510, and fourth valve 511.

The compressor 205 in this embodiment is different from the compressor in the first embodiment in that the destinations of pipes for gaseous fuel and liquid fuel are reverse. That is, the first valve 508 and the second valve 509 are connected to the third control chamber 503, and the third valve 510 and the fourth valve 511 are connected to the fourth control chamber 504.

The pipe for gaseous fuel is connected to the first control chamber 501 and the second control chamber 502. Since the sectional areas of the first control chamber 501 and second control chamber 502 are smaller than the sectional areas of the third control chamber 503 and the fourth control chamber 504, light oil is pressure fed under a common rail pressure lower than the pressure of gaseous fuel. However, since the volumetric capacities of the first control chamber and the second control chamber are smaller than the volumetric capacities of the third control chamber and the fourth control chamber, the quantity of light oil pressure fed in the same period of time can be increased as compared with in the first embodiment. Therefore, this embodiment is suitable for cases where the pressure of a common rail is lower than the pressure of a gaseous fuel pump and it is desired to pressure feed a large quantity of liquid fuel by one time of reciprocation of a piston.

FIG. 11 further shows the plane A 512 and plane B 513.

Fourth Embodiment

Figure 12:
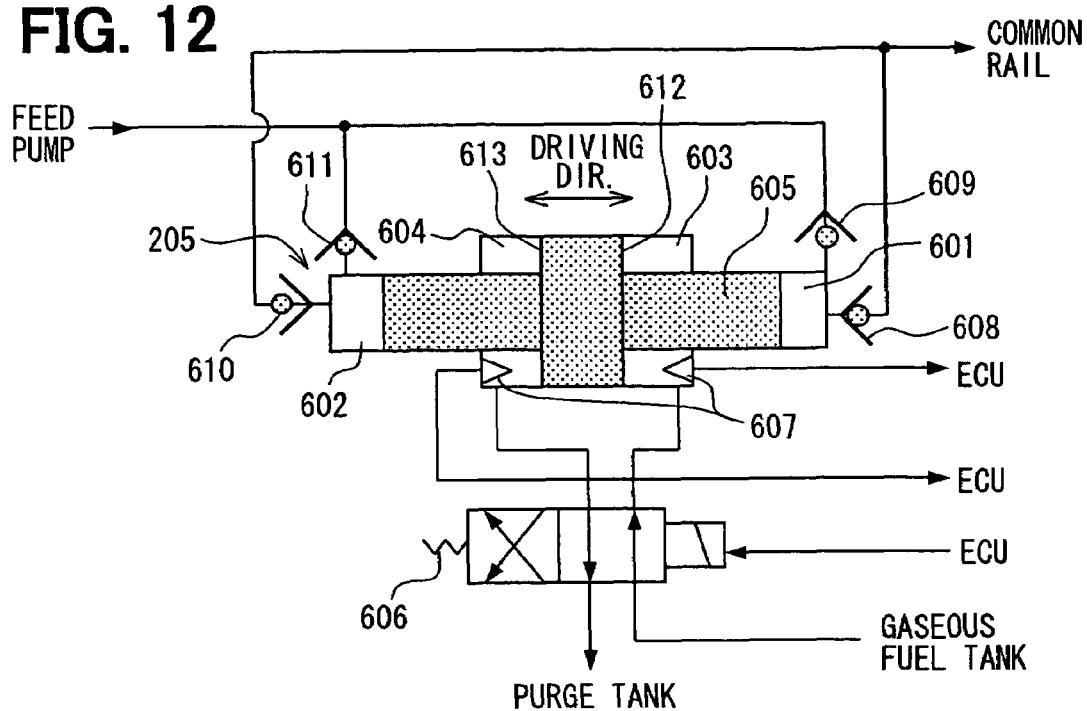
FIG. 12 is a drawing illustrating a configuration of a compressor of a fuel injection system in a fourth embodiment.

This embodiment is a modification to the first embodiment and is a system having a compressor 205 illustrated in FIG. 12. The members of the compressor 205 in this embodiment, that are not specially referred to are those having the same function and structure as of the compressor in the first embodiment.

The compressor 205 in this embodiment is different from the compressor in the first embodiment in that a first control chamber 601, second control chamber 602, third control chamber 603, and fourth control chamber 604 are identical in sectional area. When gaseous fuel is pressure fed to the third control chamber 603 or the fourth control chamber 604, a pressure piston 605 can be slid. Therefore, light oil, pressure of which is equal to that of the gaseous fuel, can be pressure fed to the common rail by the same principle as in the first embodiment.

FIG. 12 further shows a pressure control valve 606, position sensor 607, first valve 608, second valve 609, third valve 610, fourth valve 611, plane A 612, and plane B 613.

Fifth Embodiment

Figure 13:
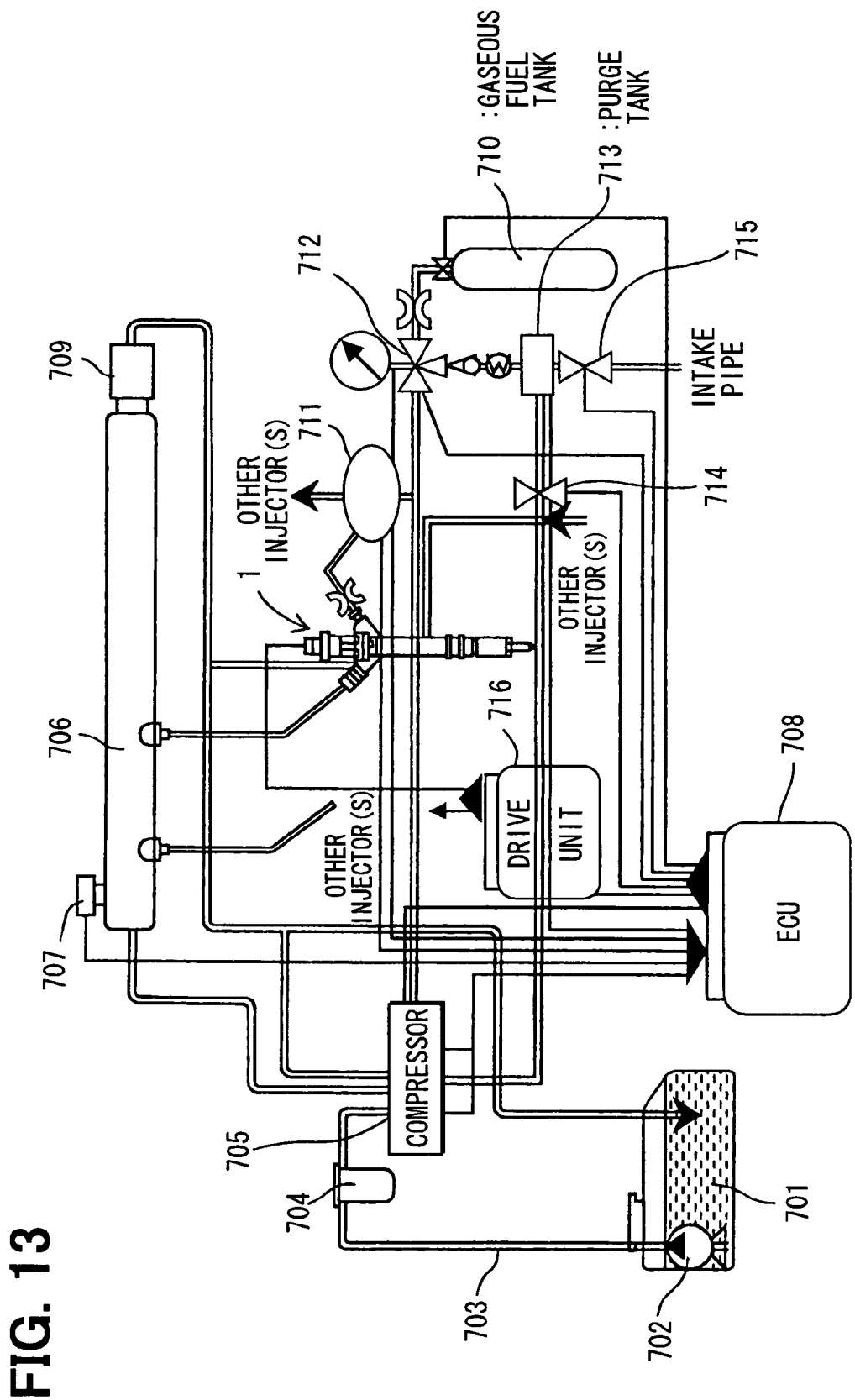
FIG. 13 is a drawing illustrating a configuration of a compressor of a fuel injection system in a fifth embodiment.

FIG. 13 illustrates a configuration of a fuel injection system in this embodiment.

The fuel injection system in this embodiment is so constructed that liquid fuel such as light oil and gaseous fuel such as hydrogen are pressure fed to injectors 1 and injected from the injectors 1. The fuel injection system in this embodiment is so constructed that when gaseous fuel such as hydrogen leaks, it performs the following operation: the gaseous fuel is recovered and stored in a purge tank, and is injected into an intake pipe according to an operating condition for the engine. The members of a compressor 705 in this embodiment, that are not specially referred to are those having the same function and structure as of the compressor in the first embodiment.

The fuel injection system in this embodiment detects an operating target and an operating condition in real time according to output and the like from various sensors and the like. The fuel injection system is so set that the following operation is performed: a main valve 712 is connected to a gaseous fuel tank 710, an accumulator 711, and a compressor 705, and a passage between the gaseous fuel tank 710 and a purge tank 713; and when there is no anomaly in the fuel injection system, the main valve 712 is closed. Therefore, gaseous fuel is pressure fed to the injectors 1 by way of the accumulator 711, and the gaseous fuel is injected into the cylinders of the engine under a predetermined condition.

The accumulator 711 has a function of reducing pulsation in gaseous fuel. The gaseous fuel is also pressure fed to the compressor 705, and is also used for pressurizing liquid fuel, pressure fed from a feed pump 702, to pressure feed it to a common rail 706. Since the passage between the gaseous fuel tank 710 and the purge tank 713 is closed, the gaseous fuel does not flow to the purge tank 713.

Figure 14:
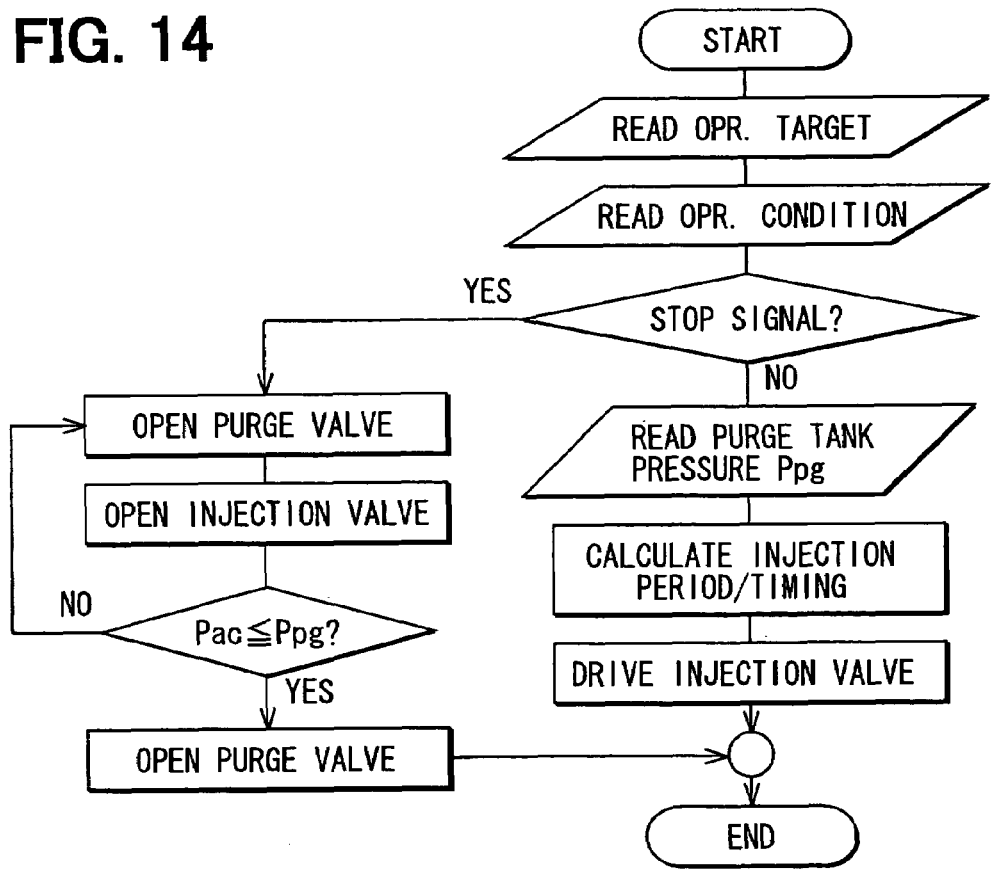
FIG. 14 is a flowchart illustrating control of the compressor of the fuel injection system in the fifth embodiment.

ECU 708 calculates the injection timing and injection quantity of the injectors and supply pressures for gaseous fuel and liquid fuel from an operating target and the present operating condition and sends a control signal in accordance with the flowchart illustrated in FIG. 14. The system in this embodiment thereby carries out appropriate fuel injection.

In cases where any anomaly occurs in the fuel injection system and the fuel injection system is stopped, it is so set that the following operation is performed: (These cases include cases where the fuel injection system is mounted in the engine of a vehicle and the vehicle is stopped and other like cases.) The main valve 712 is connected between the compressor 705 and accumulator 711 and the purge tank 713, and the passage between the gaseous fuel tank 710 and the compressor and the passage between the gaseous fuel tank 710 and the accumulator 711 are closed.

When the pressure Pac of the accumulator 711 is higher than the pressure Ppg of the purge tank 713, a purge valve 714 is opened and an injection valve 715 is closed. Therefore, the gaseous fuel in the compressor 705 and the accumulator 711 flows to the purge tank 713, and is stored in the purge tank 713. Thus, when the fuel injection system is stopped, high-pressure gaseous fuel in the gaseous fuel tank 710, accumulator 711, compressor 705, and the like can be swiftly transferred to and stored in the purge tank 713. That is, in the fuel injection system in this embodiment, gaseous fuel can be prevented from leaking out of the system.

When the gaseous fuel is increasingly collected in the purge tank 713, the pressure of the purge tank 713 rises. Meanwhile, the pressure of the accumulator 711 drops. When the pressure of the accumulator 711 becomes equal to or lower than the pressure of the purge tank 713, the ECU 708 carries out control so as to closes the main valve 712 in all the directions. Further, the ECU carries out control so as to close the purge valve 714 and the injection valve 715. This can prevent gaseous fuel from flowing out from the gaseous fuel tank 710, and further prevent gaseous fuel from flowing back from the purge tank 713 to the accumulator 711.

The gaseous fuel stored in the purge tank 713 can be used under an injection condition determined based on information from the combustion engine. (This information includes operating target, operating condition, purge tank pressure, and the like when the relevant vehicle is normally running.) The gaseous fuel in the purge tank is used by being injected into the intake pipe from the injection valve 715 connected with the purge tank 713.

At this time, fuel may be injected into the intake pipe at substantially the same time as into the injectors 1. Or, injection into the injectors 1 may be stopped when gaseous fuel is injected by the injection valve.

FIG. 13 further shows a liquid fuel tank, pipe 703, filter 704, pressure sensor 707, safety valve 709, and drive unit 716.

In the fuel injection, system in this embodiment, the gaseous fuel that leaks out of the gaseous fuel tank 710 and the like is recovered and is used as gaseous fuel again. Therefore, the driver need not handle with the gaseous fuel in the purge tank 713. This embodiment obtains the effect that a fuel cost can be reduced by an amount equivalent to the recovered fuel.

It will be obvious to those skilled in the art that various changes may be made in the above-described embodiments of the present invention. However, the scope of the present invention should be determined by the following claims.

What is claimed is:

1. A fuel injection system comprising:
   a gaseous fuel supplying unit having a first high-pressure accumulating source for pressuring gaseous fuel;
   a liquid fuel supplying unit having a second high-pressure accumulating source for pressurizing liquid fuel;
   an injector that injects the pressurized gaseous fuel and the pressurized liquid fuel;
   a pressure feeding unit that pressure feeds liquid fuel to the second high-pressure accumulating source; and
   a pressure increasing unit, which is operated under pressure of the pressurized gaseous fuel to increase pressure of liquid fuel pressure fed from the pressure feeding unit.

2. The fuel injection system of claim 1, which is assembled to an internal combustion engine,
   wherein pressure of liquid fuel is determined according to an operating condition for the internal combustion engine.

3. The fuel injection system of claim 2,
   wherein the pressure increasing unit has a cylinder and a piston that reciprocates in the cylinder, and
   wherein pressure increasing action is caused by bidirectional strokes in reciprocation of the piston.

4. The fuel injection system of claim 2,
   wherein the pressure increasing unit has a cylinder and a piston that reciprocates in the cylinder, and
   wherein pressure increasing action is caused by unidirectional strokes in reciprocation of the piston.

5. The fuel injection system of claim 1,
   wherein the pressure increasing unit includes a selector valve that switches paths providing the pressurized gaseous fuel, and
   wherein the selector valve is a two-position on/off valve.

6. The fuel injection system of claim 1,
   wherein the pressure increasing unit includes a selector valve that switches paths providing the pressurized gaseous fuel, and
   wherein the selector valve is a three-position on/off valve.

7. The fuel injection system of claim 1,
   wherein the pressurized gaseous fuel is injected from a nozzle hole of the injector, and
   wherein the pressurized liquid fuel also functions as control fluid that controls needle lift in the injector.

* * * * *